(12) United States Patent
Frasca et al.

(10) Patent No.: US 10,384,401 B2
(45) Date of Patent: Aug. 20, 2019

(54) METHOD FOR MANUFACTURING STIFFENED PANELS OF COMPOSITE MATERIAL BY MEANS OF CO-CURING

(71) Applicant: LEONARDO S.p.A., Rome (IT)

(72) Inventors: Michele Frasca, Foggia (IT); Pasquale Sabino, Foggia (IT); Felice Carifi, Vicsiano (IT); Gianni Iagulli, San Severo (IT); Carmine Suriano, Foggia (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 15/564,106

(22) PCT Filed: Apr. 7, 2016

(86) PCT No.: PCT/IB2016/051970
§ 371 (c)(1),
(2) Date: Oct. 3, 2017

(87) PCT Pub. No.: WO2016/162818
PCT Pub. Date: Oct. 13, 2016

(65) Prior Publication Data
US 2018/0079144 A1  Mar. 22, 2018

(30) Foreign Application Priority Data
Apr. 10, 2015  (IT) .................. 102015000011422

(51) Int. Cl.
*B29C 65/00* (2006.01)
*B29D 99/00* (2010.01)
(Continued)

(52) U.S. Cl.
CPC ............ *B29C 66/524* (2013.01); *B29C 51/10* (2013.01); *B29C 65/02* (2013.01); *B29C 66/112* (2013.01);
(Continued)

(58) Field of Classification Search
CPC . B29C 66/112; B29C 66/1122; B29C 66/131; B29C 66/474; B29C 66/54;
(Continued)

(56) References Cited

U.S. PATENT DOCUMENTS 5,454,895 A * 10/1995 Imparato ............... B29C 70/342
156/156
5,538,589 A * 7/1996 Jensen .................. B29C 69/004
100/211
(Continued)

FOREIGN PATENT DOCUMENTS

EP  0582160 A1  2/1994
EP  2176058 B1  8/2012

*Primary Examiner* — Anthony Calandra
*Assistant Examiner* — S. Behrooz Ghorishi
(74) *Attorney, Agent, or Firm* — Arent Fox LLP; Michael Fainberg

(57) ABSTRACT

Method for manufacturing stiffened panels comprising the following steps: forming a first and a second wet skin, each comprising a plurality of plies of preimpregnated composite material; forming a plurality of pairs of wet stringers, comprising a plurality of plies of preimpregnated material, wherein forming each pair of wet stringers comprises a) forming an assembly having a central web extending between opposite end flanges, and b) cutting the assembly along a median plane so as to form a pair of wet stringers, placing the pairs of wet stringers on the first wet skin by means of removable supporting members; turning the second wet skin over and placing it on the pairs of stringers, so as to obtain a pair of wet panels arranged above each other; and subjecting the pair of wet panels to a same curing cycle.

2 Claims, 5 Drawing Sheets

(51) Int. Cl.
  *B29C 51/10* (2006.01)
  *B29C 65/02* (2006.01)
  *B29L 31/30* (2006.01)
(52) U.S. Cl.
  CPC ........ *B29C 66/1122* (2013.01); *B29C 66/131* (2013.01); *B29C 66/474* (2013.01); *B29C 66/63* (2013.01); *B29C 66/721* (2013.01); *B29C 66/73752* (2013.01); *B29D 99/0014* (2013.01); *B29L 2031/3076* (2013.01)
(58) Field of Classification Search
  CPC ..... B29C 66/543; B29C 66/71; B29C 66/721; B29C 66/7212; B29C 66/72141; B29C 66/7254; B29C 66/727; B29C 66/73752; B29C 66/73941; B29C 66/81455; B29C 65/50; B29C 70/345; B29C 70/543; B29C 2035/0822; B29C 66/0326; B29C 66/0246; B29C 66/0346; B29K 2063/00; B29K 2105/246; B29K 2707/04; B29L 2031/3085; B29L 2031/608; B64C 3/24; Y02T 50/43

See application file for complete search history.

(56) References Cited

U.S. PATENT DOCUMENTS

| | | | |
|---|---|---|---|
| 6,190,484 B1* | 2/2001 | Appa | B29C 70/32 156/189 |
| 2006/0011289 A1* | 1/2006 | Suriano | B29C 70/342 156/245 |
| 2010/0193636 A1* | 8/2010 | De Vita | B29C 66/721 244/123.1 |
| 2016/0114538 A1* | 4/2016 | Iagulli | B29C 70/345 264/510 |

* cited by examiner

US 10,384,401 B2

METHOD FOR MANUFACTURING STIFFENED PANELS OF COMPOSITE MATERIAL BY MEANS OF CO-CURING

CROSS-REFERENCE TO RELATED APPLICATIONS

This application is the U.S. National Stage Application of International Patent Application No. PCT/IB2016/051970, filed on Apr. 7, 2016, which claims priority to Italian Patent Application No. 102015000011422, filed on Apr. 10, 2015, the contents of each of which is incorporated herein by reference in its entirety.

TECHNICAL FIELD

The present invention relates in general to the methods for manufacturing aeronautical panels of load-bearing surfaces provided with longitudinal stiffening elements (stringers).

BACKGROUND

According to a known method for manufacturing stiffened panels the stringers are manufactured separately from the outer skin. A series of plies of preimpregnated material are rolled and then cut to obtain a series of strips. Each strip is subjected to a hot-forming treatment which provides them with a cross-section of predetermined shape. An element thus shaped is assembled together with another shaped element so as to obtain a wet stiffening element. The stiffening elements thus obtained are subjected to a curing cycle in an autoclave.

The polymerized or "pre-cured" stringers are then assembled together with the wet skin; the assembly thus obtained is subjected to a second, final, curing cycle in an autoclave.

SUMMARY

One object of the present invention is to reduce the recurring costs in the manufacture of stiffened panels.

In view of this object, the invention relates to a method for manufacturing stiffened panels, comprising the following steps:
  forming a first and a second wet skin, said first and second skins each comprising a plurality of plies of preimpregnated composite material;
  forming a plurality of pairs of wet stringers, each stringer comprising a plurality of plies of preimpregnated composite material, wherein forming each pair of wet stringers comprises:
  a) forming an assembly having a central web extending between opposite end flanges, and
  b) cutting the assembly along a median plane so as to form a pair of wet stringers,
  placing the pairs of wet stringers on the first wet skin by means of removable supporting members on which the pairs of stringers have previously been arranged;
  turning the second wet skin over and placing it on the pairs of stringers with the supporting members, so as to obtain a pair of wet panels arranged above each other and provided with respective wet stringers; and
  subjecting the pair of wet panels arranged above each other and provided with respective wet stringers to a same curing cycle.

The invention also relates to a method for manufacturing stiffened panels, comprising the following steps:
  forming a first and a second wet skin, said first and second skins each comprising a plurality of plies of preimpregnated composite material;
  forming a plurality of wet assemblies, each assembly comprising a plurality of plies of preimpregnated composite material and having a central web extending between opposite end flanges,
  placing the wet assemblies on the first wet skin by means of removable supporting members on which the wet assemblies have previously been arranged;
  turning the second wet skin over and placing it on the wet assemblies with the supporting members, so as to obtain a wet box assembly;
  subjecting the wet box assembly to a curing cycle; and
  cutting the cured box assembly in half along a longitudinal median plane so as to form a pair of stiffened panels.

The two methods illustrated above differ from each other with regard to the different sequential arrangement of the cutting step, in which separation of the cut part into two mirror-symmetrical elements is obtained.

In both methods it is possible to subject each of the two wet skins to an operation for hot-compaction of the plies ("debulking"), before forming the box assembly.

Compared to the known method, with the methods according to the invention it is possible to manufacture simultaneously two panels instead of one; moreover only one pass in an autoclave is carried out in order to polymerize simultaneously the skins and the stringers. In fact, the methods according to the invention constitute an inventive adaptation of the stiffened panels according to a method for manufacturing multiple-spar wing boxes described in the publications EP 0 582 160 and EP 2 176 058 in the name of the same Applicant.

BRIEF DESCRIPTION OF THE DRAWINGS

A number of preferred, but non-limiting embodiments of the invention will now be described, with reference to the accompanying drawings in which.

DETAILED DESCRIPTION

The method according to the invention is intended for the manufacture of stiffened panels, in particular wing or tail unit panels, such as those of the central and outer wing boxes, or those of the tail fin.

A stiffened panel comprises conventionally an outer skin and a plurality of longitudinal stiffening elements, or stringers, joined to the skin. The outer skin and the stringers are obtained by joining together, using methods which will be specified below, layers of prepreg. For the purposes of the invention, the term "prepreg" is understood in the conventional sense of a semifinished product comprising reinforcing fibres and a resin matrix in which these fibres are immersed. The fibres may be arranged in different configurations, for example in a unidirectional layer, in two layers having orientations different from each other, or in the manner of a woven fabric. The prepregs are generally prepared in the form of strips and wound in rolls.

Figure 1:
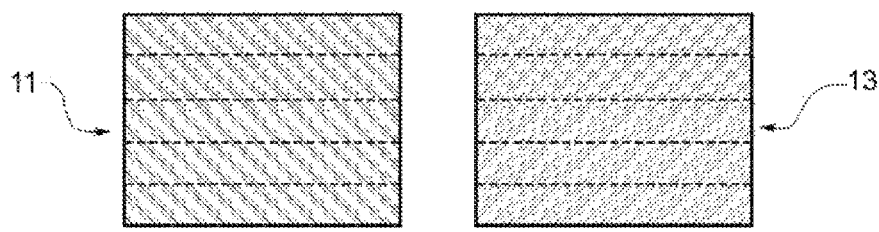
FIG. 1 shows a simplified plan view of two sheets each formed by a layered arrangement of plies of preimpregnated material, for manufacture of respective series of stringers.

FIG. 1 shows two sheets 11, 13 each formed by a layered arrangement of plies of preimpregnated material. Each of these layered arrangements is obtained in a conventional manner by depositing in succession the various plies onto a respective mould (not shown) in a desired arrangement, generally with different orientation of the fibres in adjacent layers.

Figure 2:
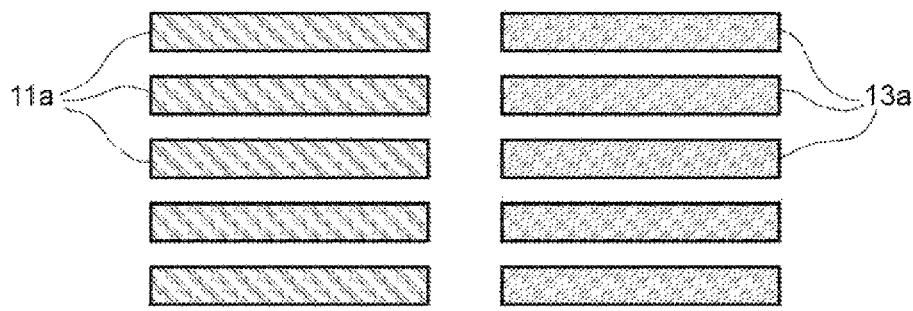
FIG. 2 shows the two sheets cut so as to each form a series of strips.

In order to prepare the stringers, each sheet 11, 13 is cut into strips 11a, 13a with the desired dimensions (FIG. 2).

FIGS. 3 to 11 show the steps for producing the stringers. For the purposes of the invention neither the type of process for obtaining the stringer nor the specific form of the latter is essential. What is essential, however, is that the stringers obtained at the end of the steps of the aforementioned process are wet, namely that the resin matrix of the preimpregnated material which forms them has not polymerized, and that each panel is obtained by means of separation from a single box along a longitudinal median plane.

Figure 3:
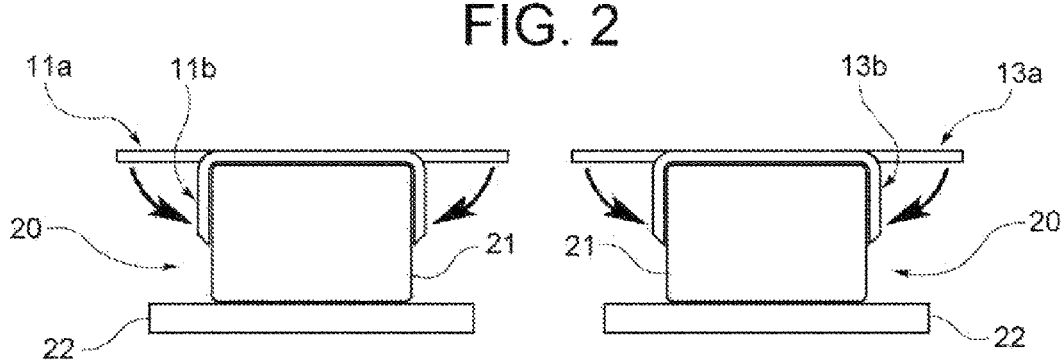
FIGS. 3 and 4 show two of the strips according to FIG. 2 subjected to forming in order to produce two elements with a C-shaped cross-section.
Figure 4:
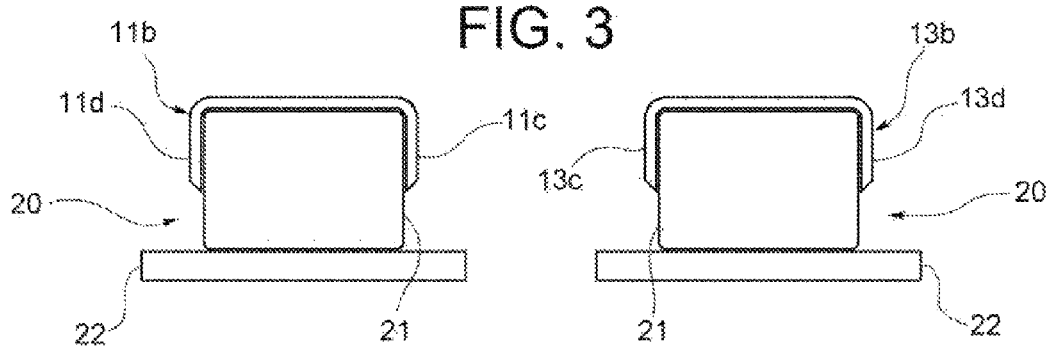

FIGS. 2 and 3 show a step of the process in which a precursory element 11b, 13b having a C-shaped cross-section is obtained from a completely flat prepreg strip 11a, 13a. A forming tool denoted overall by 20 comprises an elongated mandrel 21 with an overall rectangular cross-section positioned along one of its sides on a flat rigid plate 22. The prepreg strip 11a, 13a is initially placed on the mandrel 21, which is introduced into a thermoforming apparatus provided with infrared lamps (not shown) which heat the sheet to a temperature value such as to allow relative sliding of the prepreg layers during the operation of folding of the flanges (i.e. the end fins) without puckering. Once the desired temperature has been reached, a vacuum is applied. An empty bag (not shown) mounted on the strip 11a, 13a and sealed on the plate 22 is then retracted downwards owing to the effect of the vacuum applied, forcing the "fins" of the strip 11a, 13a to fold downwards, reproducing the shape of the mandrel 21. Each strip, which is initially flat, is thus provided with a C-shaped cross-section, having end flanges 11c, 11d, 13c, 13d, by means of a thermoforming process (FIG. 4).

Figure 5:
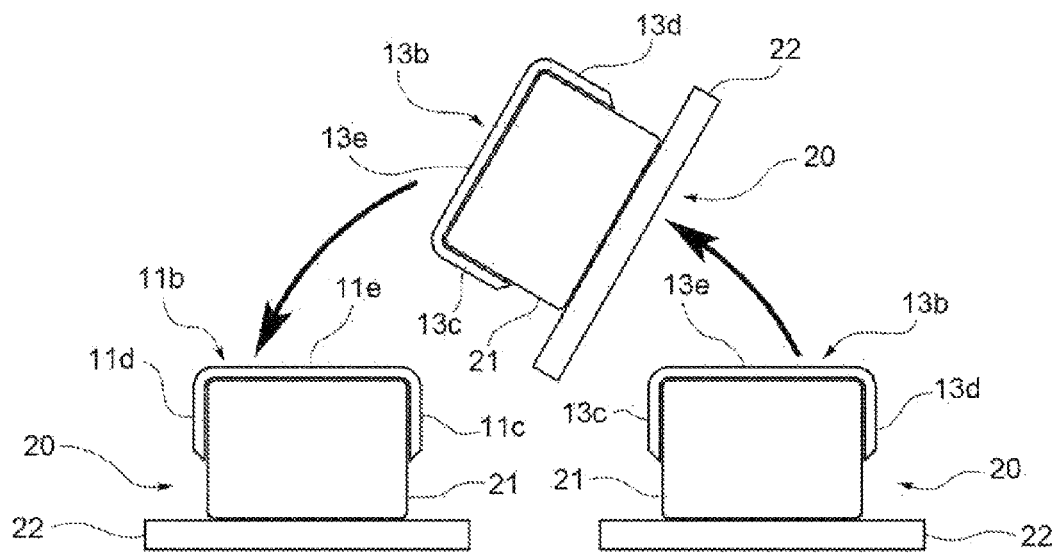
FIGS. 5 and 6 show a C-shaped element turned over and arranged above another C-shaped element so as to produce an assembly with a double T-shaped cross-section.
Figure 6:
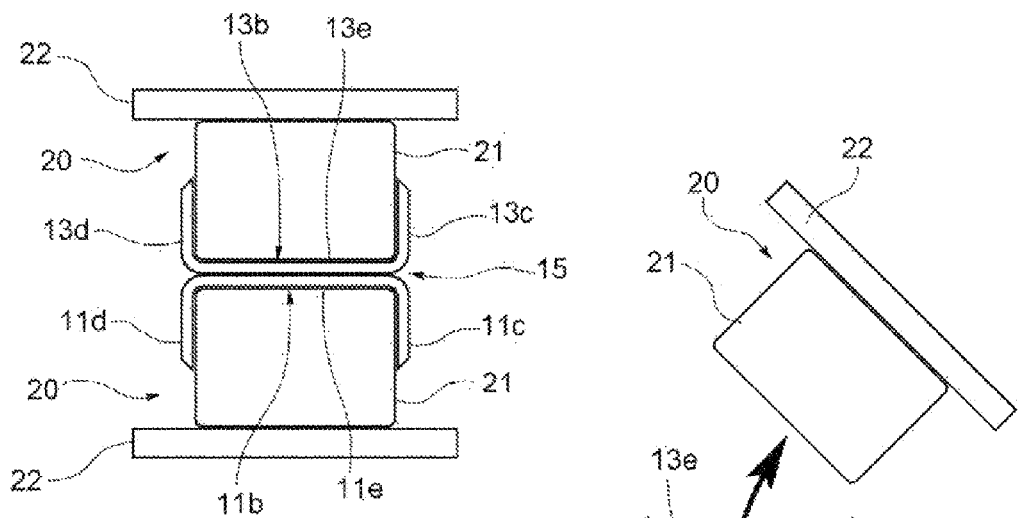
Figure 7:
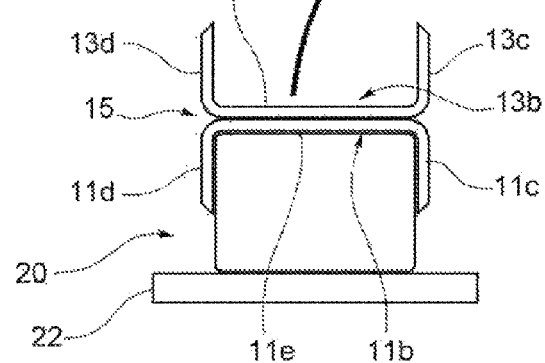
FIG. 7 shows the removal of an upper mandrel.

The two precursory elements 11b, 13b thus obtained are then arranged on top of each other, as shown in FIGS. 5 to 7. One of the two precursory elements, 13b in the figures, is turned over by turning over the forming tool 21 which supports it (FIG. 5) and, in this overturned configuration, is arranged above the other precursory element, 11b, resulting in adhesion between the respective central webs 11e, 13e (FIG. 6). The two precursory elements 11b, 13b therefore form an assembly 15 having a double T-shaped cross-section. Finally, the forming tool 21 associated with the overturned upper precursory element 13b is removed, therefore leaving the overturned precursory element 13b exposed at the top.

Figures 8, 9:
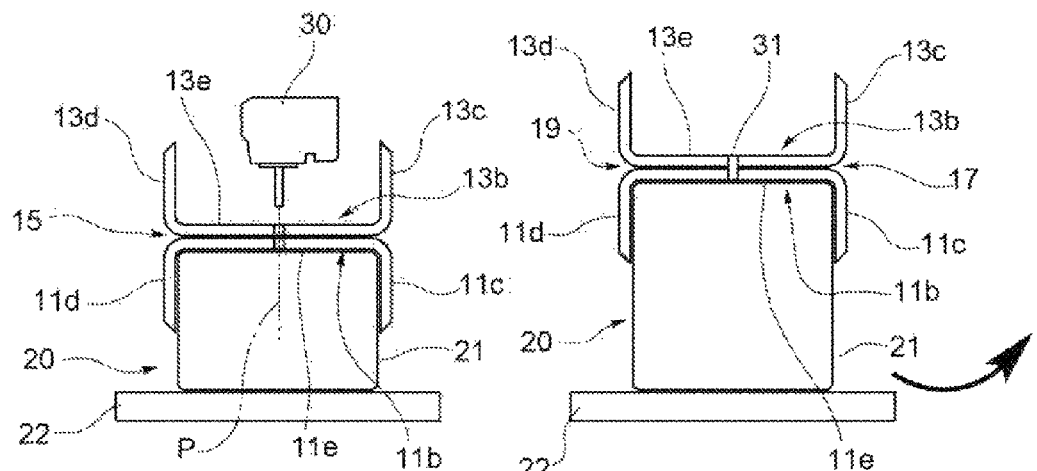
FIGS. 8 and 9 show the cutting of a double T-shaped assembly so as to form a pair of wet stringers and the positioning of a separator element between these stringers.
Figures 10, 11:
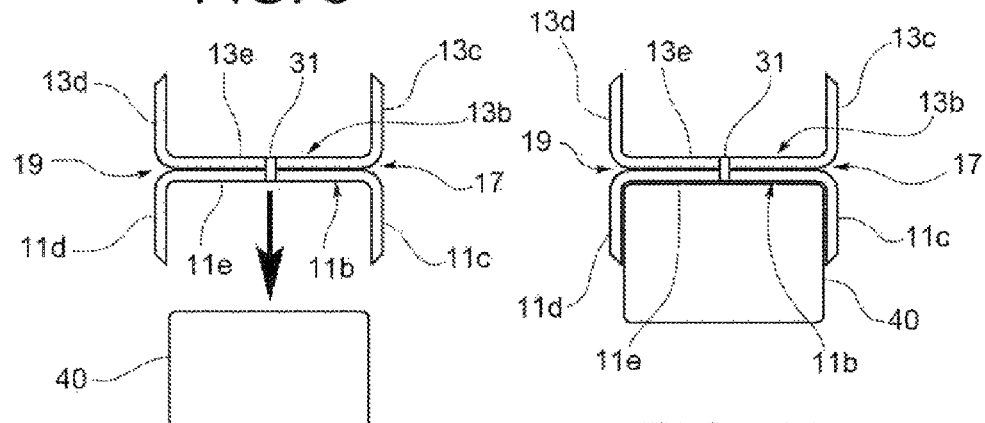
FIGS. 10 and 11 show the positioning of the pair of wet stringers on a supporting member.

FIG. 8 shows a cutting operation. By means of a cutting tool 30, for example of the type for performing ultrasound cutting, the double T-shaped assembly 15 is cut longitudinally along a median plane P so as to form a pair of separate wet stringers 17, 19 each having a T-shaped cross-section. In order to prevent the wet stringers 17, 19 from accidentally coming into contact with each other during the subsequent steps of the manufacturing process, a separator element 31 is inserted inside the slit between the wet stringers 17, 19 obtained by the cutting operation (FIG. 9).

The remaining forming tool 20 is then removed and the pair of wet stringers 17, 19 (with separator element 31) are positioned on a supporting member 40 (FIGS. 10 and 11) having shaped surfaces so as to reproduce the profile of the stringers. The supporting members 40 act as a support for the preimpregnated material, not yet cured, of the components which they support.

Figure 12:
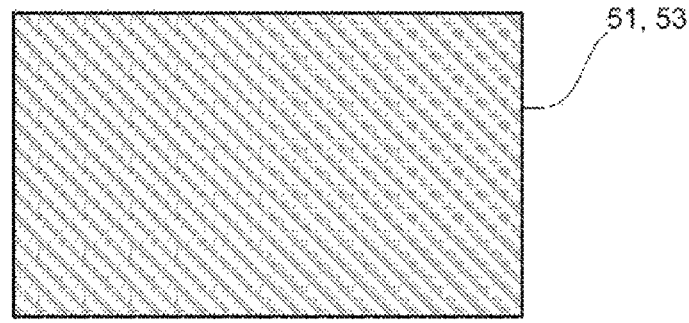
FIG. 12 shows a simplified plan view of a sheet formed by a layered arrangement of plies of preimpregnated material, for producing a wet skin.

FIG. 12 shows a sheet 51 formed by a layered arrangement of plies of preimpregnated material. This layered arrangement is obtained in a conventional manner by depositing in succession the various plies onto a respective mould (not shown) in a desired arrangement, generally with different orientation of the fibres in adjacent layers. A second sheet 53, shown in FIG. 14 et seq., is formed in a similar manner. The moulds for the two sheets 51, 53 may consist of two halves 61, 63 of a shell apparatus (shown in FIG. 15), for example an apparatus similar to that described in EP 0 582 160.

The sheets 51, 53 are intended to form the skins of the respective stiffened panels; below they will therefore be referred to as "skins".

FIGS. 13 to 18 show the steps for producing the stiffened panels.

Figure 13:
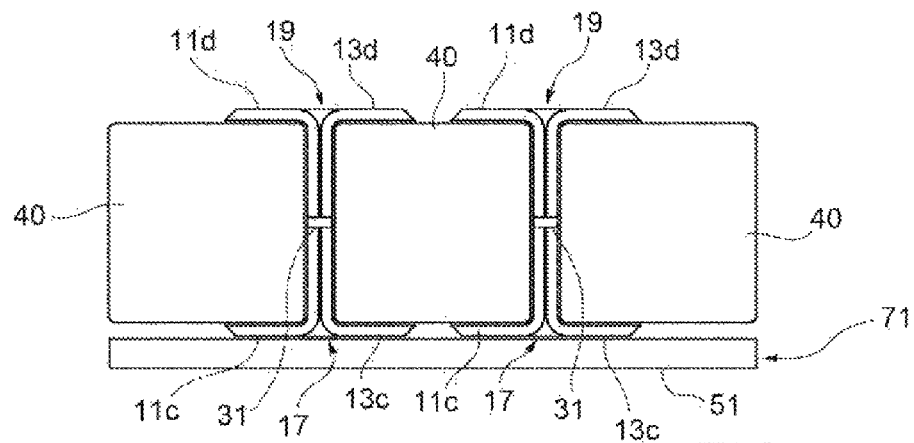
FIG. 13 shows the positioning of the pairs of stringers with the supporting members on a first skin.

The wet stringers 17, 19 produced according to the process steps described above are assembled on the first skin 51, which is arranged on the corresponding mould half (FIG. 13). In particular, the pairs of wet stringers are arranged so that a bottom stringer of each pair, indicated by 17 in the figures, is placed in contact by means of its bottom flanges 11c, 13c with the first skin 51 and the supporting members 40 are arranged between adjacent pairs of wet stringers so as to support the webs of the stringers 17 and 19 and the flanges 11d, 13d of the top stringers 19 which do not make contact with the first skin 51.

Figure 14:
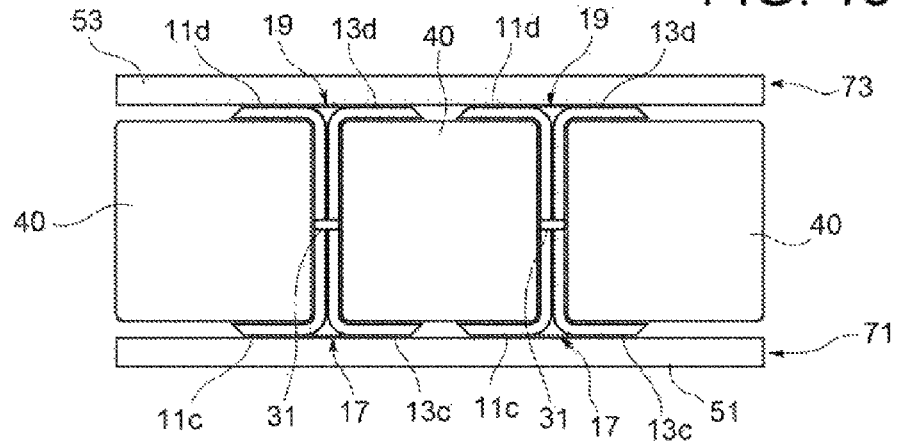
FIG. 14 shows the positioning of a second skin on the pairs of stringers, for producing a pair of wet panels.

Once the aforementioned components have been arranged on the first mould half, the second skin 53 is turned over, by turning over the second mould-half on which said skin is positioned, and is arranged on the pairs of wet stringers 17, 19 in contact with the flanges 11d, 13d of the upper stringers 19 of each pair (FIG. 14). A pair of wet panels 71, 73 arranged in a mirror-symmetrical manner above each other, is thus formed.

Figure 15:
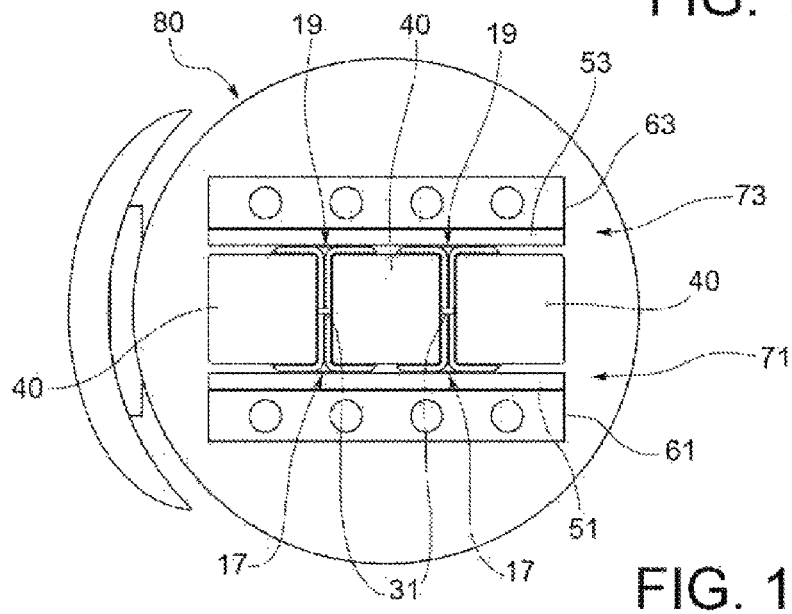
FIG. 15 shows the introduction of a mould with the wet panels into an autoclave.

The pair of wet panels 71, 73 obtained in accordance with the steps indicated above, after insertion inside the shell apparatus 61, 63, is introduced into an autoclave 80 for a curing cycle intended to achieve consolidation and simultaneous curing (co-curing) of the skins 51, 53 and the stringers 17, 19 (FIG. 15).

Figure 16:
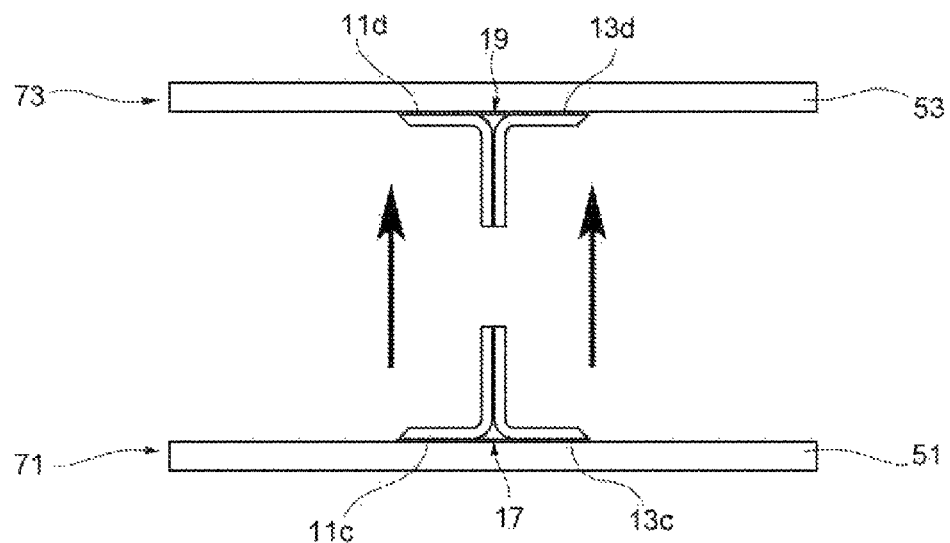
FIGS. 16 and 17 shows the raising and turning over of the second cured panel with respect to the first cured panel.
Figure 17:
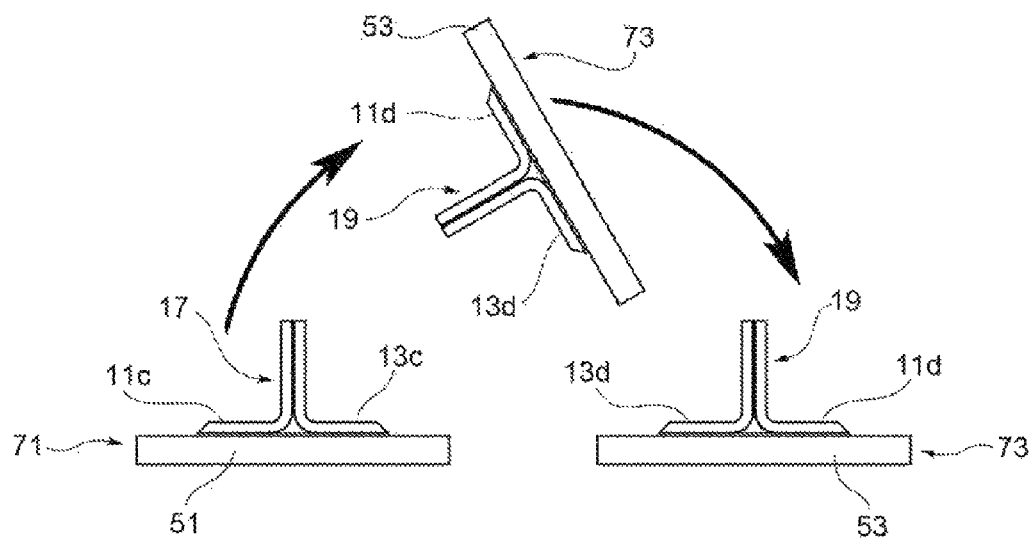

After extracting the apparatus from the autoclave, the upper mould is turned over so that the cured panels 71, 73 are separated from each other, with removal and overturning of the second panel 73 (FIGS. 16 and 17).

Figure 18:
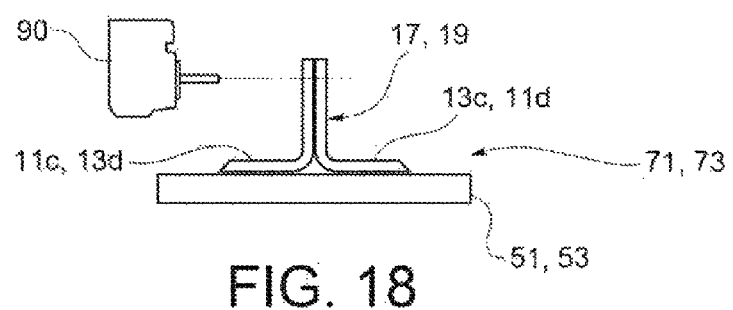
FIG. 18 shows the trimming of a cut edge along a stringer of the cured panel.

The cut edge present on the web of each stringer 17, 19 of the panels 71, 73 is subjected to trimming by means of a trimming apparatus 90 (FIG. 18).

The panels thus obtained may be subjected to further machining steps conventional per se, such as perimetral milling, non-destructive inspection, dimensional inspection and various finishing operations.

According to an alternative mode of implementation of the method according to the invention, once the C-shaped precursory elements 11b, 13b have been joined together along their central web, so as to form an assembly 15 having a double T-shaped cross-section, immediate longitudinal cutting of the assembly 15 is not performed. In this case, the double T-shaped assemblies 15 are assembled together with the skins 51 and 53 and co-cured with them, in a manner similar to that described with reference to FIGS. 10-15. Once the cured box assembly formed by the skins 51, 53 and by the double T-shaped assemblies 15 has been extracted from the autoclave, the cured box-assembly is cut into two along the longitudinal median plane of the assembly, so as to form the pair of stiffened panels.

The invention claimed is:

1. Method for manufacturing stiffened panels, comprising the following steps:

forming a first and a second wet skin, said first and second skins each comprising a plurality of plies of preimpregnated composite material;

forming a plurality of pairs of wet stringers, each stringer comprising a plurality of plies of preimpregnated composite material, wherein forming each pair of wet stringers comprises:

a) forming an assembly having a central web extending between opposite end flanges, and b) cutting the assembly along a median plane so as to form a pair of wet stringers, placing the pairs of wet stringers on the first wet skin by means of removable supporting members on which the pairs of stringers have previously been arranged;

turning the second wet skin over and placing it on the pairs of stringers with the supporting members, so as to obtain a pair of wet panels arranged above each other and provided with respective wet stringers; and subjecting the pair of wet panels arranged above each other and provided with respective wet stringers to a same curing cycle.

2. Method according to claim 1, wherein forming each pair of wet stringers comprises:

forming a pair of precursory elements having a C-shaped cross-section, joining the precursory elements together at their central webs so as to form an assembly having a double T-shaped cross-section, longitudinally cutting the assembly to form a pair of wet stringers each having a T-shaped cross-section.

\* \* \* \* \*